E. J. R. BEATTEY.
EYEGLASS MOUNTING.
APPLICATION FILED JAN. 23, 1918.

1,272,356.

Patented July 16, 1918.

Inventor
Earle J. R. Beattey

By Howard E Barlow
Attorney

UNITED STATES PATENT OFFICE.

EARLE J. R. BEATTEY, OF PROVIDENCE, RHODE ISLAND, ASSIGNOR TO UNIVERSAL OPTICAL CORPORATION, OF PROVIDENCE, RHODE ISLAND, A CORPORATION OF RHODE ISLAND.

EYEGLASS-MOUNTING.

1,272,356.  Specification of Letters Patent.  Patented July 16, 1918.

Application filed January 23, 1918. Serial No. 213,283.

*To all whom it may concern:*

Be it known that I, EARLE J. R. BEATTEY, a citizen of the United States, and resident of the city of Providence, in the county of Providence and State of Rhode Island, have invented certain new and useful Improvements in Eyeglass-Mountings, of which the following is a specification.

This invention relates to eyeglass mountings, and has for its object to provide an improved construction of mounting having a combined metallic and non-metallic frame or rim, said improvement rendering the frame very strong and durable and inexpensive to manufacture, the frame or rim being so constructed that its ends will not spring apart or separate when clamped about the lens.

With these and other objects in view, the invention consists of certain novel features of construction as will be more fully described and particularly pointed out in the appended claim.

Figure 1:
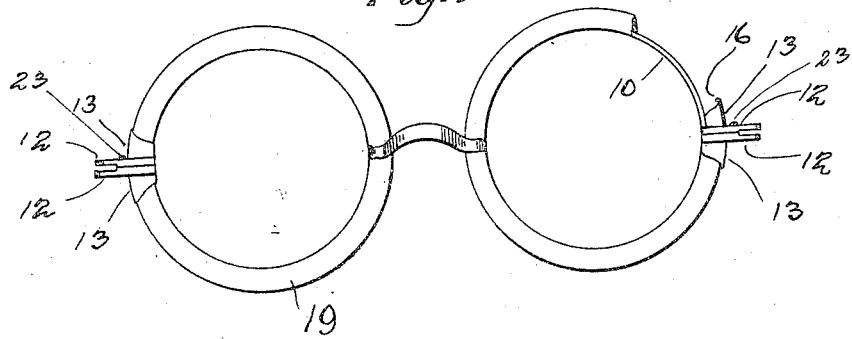

In the accompanying drawing:

Figure 1— is a rear elevation of a pair of the lens frames showing a portion of one of the rims broken away.

Figure 2:
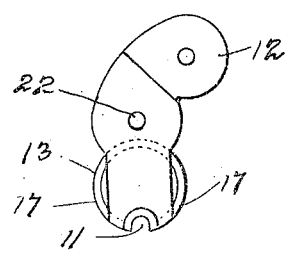

Fig. 2— is an enlarged view of the end of one of the frames showing the construction of the end piece and the manner in which it is secured to the metallic rim and the socket member.

Figure 3:
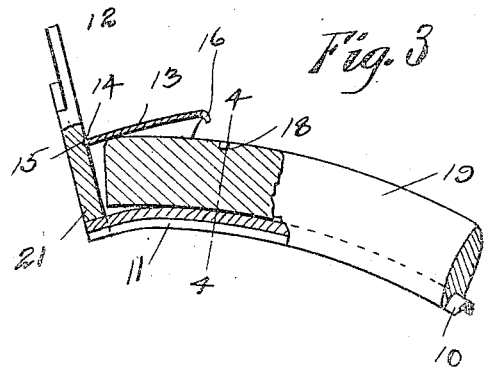

Fig 3— is a sectional side elevation of an end portion of the metallic and non-metallic portions showing the socket member as connected to the end member, the latter being bent at a slight angle to permit the positioning of the non-metallic rim therein.

Figure 4:
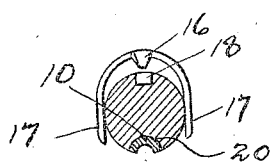

Fig. 4— is an end view on line 4—4 of Fig. 3, showing the arrangement of the socket member and its spur as raised to permit the entrance of the non-metallic rim.

Figure 5:
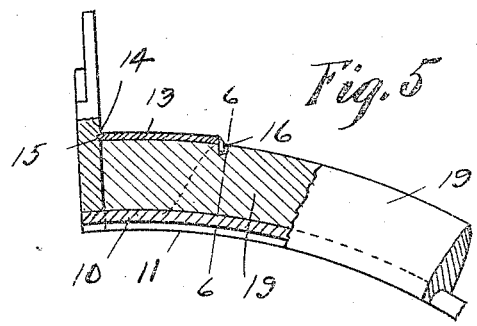

Fig. 5— shows the end piece and socket member in operative position causing the spur in the socket to enter a corresponding depression in the non-metallic rim locking the whole together.

Figure 6:
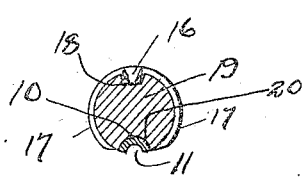

Fig. 6— is an end view on line 6—6 of Fig. 5 showing the spur as having entered the depression in the non-metallic frame and the wings of the socket as bent around to embrace the body of the non-metallic frame.

Referring to the drawings, 10 designates the metallic frame portion of the eyeglass mounting, which is of a shape to embrace the lens as illustrated in Fig. 1, being made of pliable material and grooved slightly as at 11, see Fig. 2, to receive and retain the lens.

The opposite ends of this frame are provided with end members 12 which are permanently fixed to the ends of this metallic frame and are set at a right angle thereto.

Each end piece is provided with a socket member 13, preferably constructed of a band of thin metal, one edge 14 of which engages a recessed portion 15 in the end member 12 and is soldered or otherwise permanently connected thereto, so that the end member forms the bottom of the socket. The outer or free edge of this socket member is provided with an inwardly projecting tongue or spur 16 formed from the stock of the band, the sides or wings of this socket member being adapted to be bent or closed inwardly and folded about to embrace the body of the non-metallic outer rim after its end has been passed thereinto and the spur 16 of the socket positioned in the recess 18 therein, as illustrated in Figs. 5 and 6.

This non-metallic rim 19 may be formed of celluloid, xylonite, shell or other suitable material and is preferably grooved on its inner face as at 20, to fit over and receive the metallic frame 10; and in order to firmly secure the ends of the non-metallic rim so that it cannot become loosened and separated from the metallic frame around which it is bent, I first bend the end member 12 slightly forward on its inner metallic frame, see Fig. 3, which raises the outer edge of the band portion of the socket member lifting the spur 16 clear of the rim. After this rim has been positioned I bend back this end member which carries the spur into the recess 18, see Fig. 5, and then I fold the straightened out wings 17 of the socket band about the lower edge of the body portion of the non-metallic rim, thereby securely fastening all of these end members firmly together so that none of the parts can possibly separate under any strain which may be brought to bear upon the mounting.

One of the features of this invention is that by this construction the end member 12 is provided with a double bearing which serves to firmly and rigidly support it against any possibility of springing or yielding when pressure is brought to bear upon the same by the binding screw 23 which passes through the hole 22, in clamping the frame about the lens. This construction obviates a serious difficulty heretofore experienced in constructions where but a single bearing is obtained, for if the end member is secured to the edge of the socket only, it would permit the spreading apart of the ends of the frame when clamped about the lens.

The foregoing description is directed solely toward the construction illustrated, but I desire it to be understood that I reserve the privilege of resorting to all the mechanical changes to which the device is susceptible, the invention being defined and limited only by the terms of the appended claim.

I claim:

An eyeglass mounting comprising a split metallic lens-receiving frame having outwardly-extending end pieces at the split, the metal of the lens-receiving frame being pliable in order that it may be bent adjacent the end pieces so that the latter may be tilted with reference to the main part of the frame, a split non-metallic rim surrounding the lens-receiving frame and having depressions adjacent the end pieces, and a band of thin sheet metal soldered to each end piece and curved about the adjacent portion of the metallic rim to provide a pocket, the bottom of the pocket being formed by the end piece and said band being provided at its free edge with an inwardly-extending tongue, formed from the stock of the band, and whose dimensions and location are such that when the pocket is tilted outwardly by bending the pliable frame at the base of the pocket, the non-metallic frame can be fitted therein, and when the pocket is straightened out again the tongue will enter the depression in the end of the non-metallic rim, this being the only means required for retaining the non-metallic frame in place on the metallic frame.

In testimony whereof I affix my signature in presence of two witnesses.

EARLE J. R. BEATTEY.

Witnesses:
HOWARD E. BARLOW,
A. F. MACREADY.